April 5, 1932. E. M. BROGDEN ET AL 1,852,144
PROTECTION OF FRESH FRUITS AGAINST BLUE MOLD AND THE LIKE
Original Filed Dec. 15, 1924 2 Sheets-Sheet 1
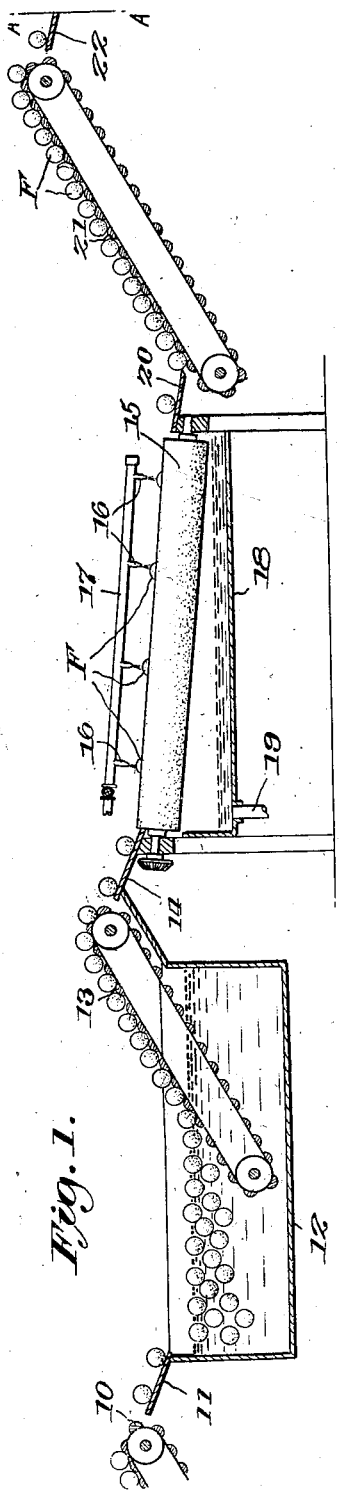
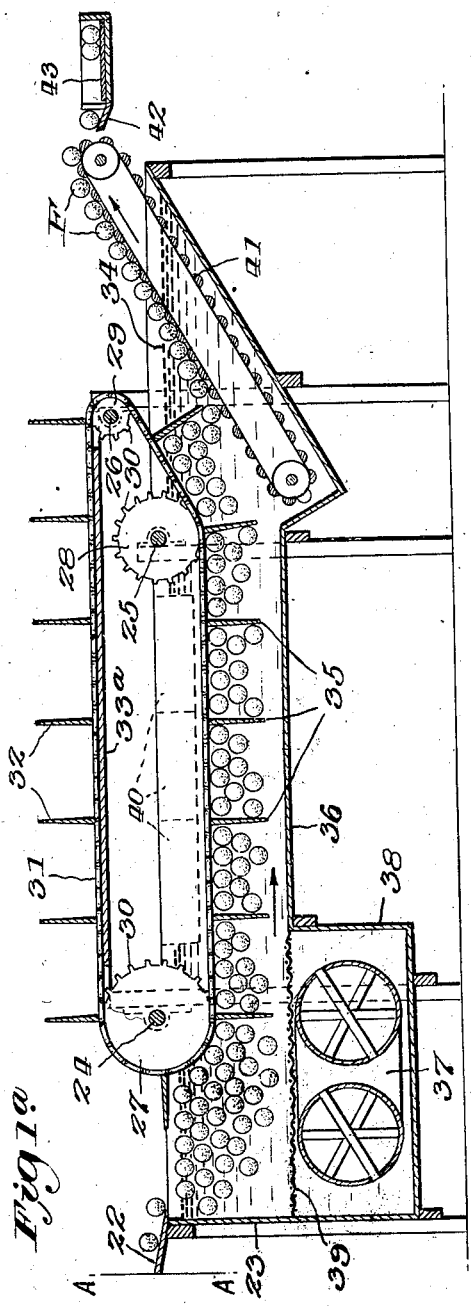
Inventor
Ernest M. Brogden,
Miles L. Trowbridge,
By Steward & McKay
their Attorneys

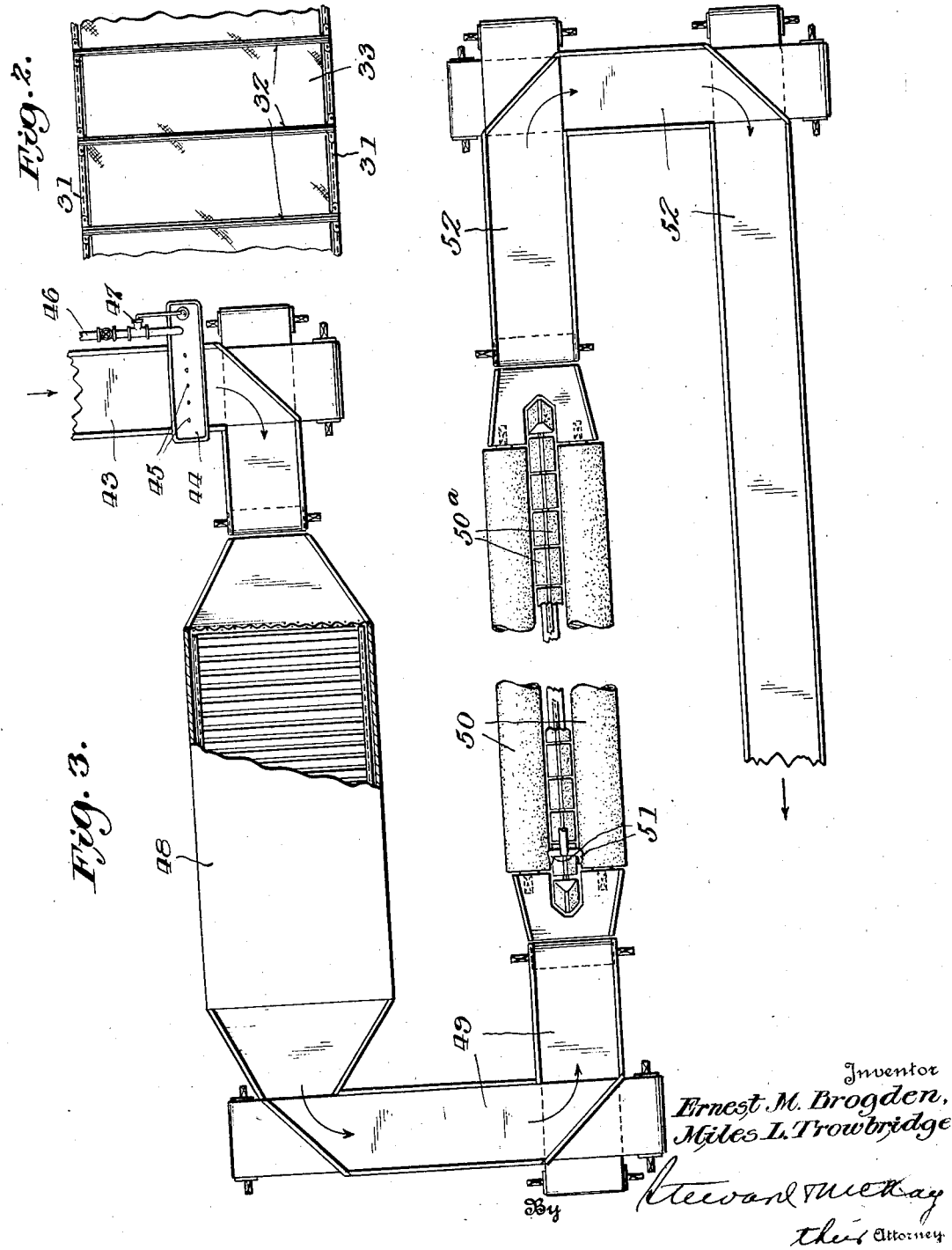

Patented Apr. 5, 1932

1,852,144

UNITED STATES PATENT OFFICE

ERNEST M. BROGDEN, OF POMONA, AND MILES L. TROWBRIDGE, OF PALMS, CALIFORNIA, ASSIGNORS TO BROGDEX COMPANY, OF WINTER HAVEN, FLORIDA, A CORPORATION OF FLORIDA

PROTECTION OF FRESH FRUITS AGAINST BLUE MOLD AND THE LIKE

Application filed December 15, 1924, Serial No. 756,121. Renewed March 21, 1931.

This invention relates to protection of fresh fruits against blue mold and the like; and in particular it relates to the preparation of fresh fruits for market in which the fruit is contacted with an aqueous solution containing salts of both boric and sulfurous acid, said solution being of such character and employed under such conditions as to exert an inhibiting effect upon blue mold and other organisms causing decay. The invention includes not only the process of treating fresh fruit as hereinafter described, but also the novel compositions employed in the treatment.

It is a well known fact that in the business of handling and marketing fresh fruit there are large losses due to decay caused by mold and other decay organisms to the attacks of which fruits are susceptible in varying degree. Taking the citrus fruit industry as typical, decay developing between the time of packing the fruit where it has grown and disposing of the fruit in the market to which it is shipped very commonly amounts to five or ten per cent of a given shipment, and in many cases is far greater. This is so not notwithstanding elaborate precautions taken both in packing methods and in shipping the fruit to market. More careful handling of the fruit in picking and packing, in order to avoid bruising, scratching or otherwise wounding it, and thus affording lodgment for mold spores and the like, has been urged upon those in the industry as one of the most effective methods of keeping down blue mold decay which is responsible for by far the greater part of decay losses. Shipping the fruit under refrigeration is another method commonly resorted to for the purpose of checking blue mold development temporarily and thus holding the percentage of decay down long enough to avoid excessive penalties in price when the fruit is offered for sale in the market for which it is destined; but refrigeration is admittedly a make-shift serving principally to transfer the loss from the shipper to the receiver.

According to the invention to be more fully hereinafter disclosed, fruit can be treated effectively in such a way as to greatly reduce and in most cases practically eliminate decay losses attributable to blue mold, and in large measure also other forms of decay or rot such as diplodia (stem-end rot) alternaria, etc.

In referring to the invention as applicable to the treatment of fruit, it is to be understood that the term "fruit" is used in a broad sense to include not only oranges, grapefruit, lemons, tangerines, apples, pears, etc. to which the term "fruit" is more usually applied in a narrow sense, but also vegetables, such as tomatoes for instance, which can be successfully treated in the manner herein disclosed. At the present time, however, the process is of particular utility in the treatment of citrus fruits for prevention of blue mold and other forms of decay above referred to, and accordingly, in the detailed description hereinafter given, reference will be made more particularly to the treatment of citrus fruit by way of illustrative example without intending thereby to limit the broad scope of the invention.

The present applicants have heretofore discovered that blue mold and other forms of decay fungi afflicting fresh fruit can be successfully combated by proper treatment of the fruit with an aqueous solution of common borax of mold-inhibiting concentration. Extensive use of this method of treatment on a large scale has given excellent results, blue mold decay losses in large-scale commercial shipments to distant markets, without refrigeration, extending over a relatively long period, having been consistently reduced to a negligible amount. However, in the practical application of the aforesaid new treatment, there are certain technical difficulties which, although they can be and are overcome by proper conduct of the process as carried out in the packing house, are nevertheless sometimes troublesome and therefore desirable to eliminate. For example, in treating fruit with a warm solution of borax in greater concentration than four or five ounces to the gallon, which is sometimes desirable, trouble is occasionally experienced from the borax crystallizing out when the solution is allowed to cool down in the treating apparatus to room temperature after a run has been finished. Care must be taken, for example, to thoroughly flush out circulating pumps used to handle the solution, since otherwise they may be rendered inoperative by hard crystalline deposits of borax therein. There are also other objectionable results from this tendency to crystallization which need not be discussed here in detail. Furthermore, although treatment with a solution of borax has proved highly successful, as stated, it has been found that in the case of soft or "dead-ripe" fruit, the mold-inhibiting action is not always as fully effective as it is in the case of firmer fruit such as is obtainable earlier in the season.

One of the present applicants has also found heretofore that alkaline bisulfites, and especially sodium bisulfite, if employed in proper concentration and under proper operating conditions, can also be used effectively in combating blue mold and other decay organisms. As in the case of borax, sodium bisulfite acts most effectively in a fairly warm solution; but unfortunately a warm solution of sodium bisulfite of effective mold-inhibiting concentration or strength is difficult to use under the conditions ordinarily prevailing in packing house practice without serious inconvenience to operators or attendants because of the fumes of sulfurous acid gas that are freely given off. Precautions may be taken, of course, to so house the system of treating apparatus that the objectionable fumes can for the most part be prevented from escaping into and contaminating the air in the packing house; but the necessary equipment is apt to be expensive both in first cost and maintenance, besides complicating the general scheme of apparatus and its operation. Furthermore, a warm solution of sodium bisulfite has a pronounced corrosive action upon the usual metal linings of fruit-handling tanks, as well as upon the metal parts of other apparatus units.

It has now been found by the present applicants that the desirable mold-inhibiting properties of both borax and sodium bisulfite can be availed of in practice, while avoiding the above-mentioned difficulties and at the same time achieving certain new and highly advantageous results, by employing both reagents together in a treating solution which may be broadly described as a treating solution comprising alkali metal salts of boric and sulfurous acids. In this connection the term "alkali metal" is to be understood broadly as including not only the metals proper of the alkali metal group but also the ammonium radical.

The use of the two reagents in a treating solution of the character described results in certain very important and unexpected advantages. Not only is the mold-inhibiting action of the combination very rapid and pronounced, but it is found that whereas borax is only sparingly soluble in water at room temperature, and therefore tends to crystallize out upon cooling of more concentrated warm solutions, the association of the bisulfite with borax in the solution does away with this objection. In other words the solubility of the borax appears to be very greatly increased by the addition of bisulfite to the solution, this increase in solubility being very marked. Whether this is due to some chemical reaction between the borax and the bisulfite resulting in formation of double salts that are relatively very soluble in water is not known to the present applicants who are, however, content to note the fact regardless of any theoretical considerations that may be involved. This desirable property of solutions containing both salts mentioned makes it possible to use lower treating temperatures, if desired, without lowering the concentration of the solution; but generally it is more desirable in all cases to use fairly warm solutions rather than cool because of the generally more efficient mold-inhibiting action of the warm solutions. However, it is sometimes desirable to use solutions of higher concentrations than would be possible or practically feasible with borax alone, and in such cases, among others, a borax-bisulfite solution can advantageously be availed of.

Generally speaking, the decay-inhibiting action of the solution herein described, which may be conveniently referred to as a mixed or combination solution, is more pronounced than a solution of borax alone, as has already been pointed out. This is more especially true when the mixed solution is somewhat acid in reaction, which in the specific case of a solution of borax and sodium bisulfite signifies that the proportion of borax employed is insufficient to fully neutralize the loosely bound portion of the sulfurous acid in the bisulfite. For example, when a mixed solution is prepared by dissolving in water three parts of borax and one part of sodium bisulfite, by weight, the solution is substantially neutral in reaction to phenolphthalein indicator and the superiority in mold-inhibiting action of this neutral solution over a solution of borax alone in comparable concentration is not so marked. However, if the proportion of borax be reduced, the solution exhibits an acid reaction and there is also a very pronounced increase in its mold-inhibiting effect. In practice, a solution made up with two parts of borax and one part of sodium bisulfite, by weight, is found to exert excellent inhibiting action against mold and rot organisms generally, and at the same time it can be used in iron-lined tanks without undue corrosive action on the metal. In solutions where this proportion of borax to sodium bisulfite is maintained, the use of from four to eight ounces of borax with two to four ounces of sodium bisulfite is found to give good results. Such solutions, as well as those containing greater proportions of borax, are practically free from any odor of sulfur dioxid and are therefore of such stability that they can be used in practical packing house work without inconveniencing the operatives even in the absence of special precautions. As examples of other mixed solutions in which borax is in predominating proportion, may be mentioned those containing from seven to eight ounces of borax to four ounces of sodium bisulfite per gallon of water, these solutions still showing some acidity and being highly efficient in their mold-inhibiting action.

For some purposes, especially when the treatment of the fruit is effected with the aid of superatmospheric pressure, as described hereinafter, the use of mixed solutions in which the sulfurous acid radical is present in much larger proportions, relatively to the boric acid radical, is desirable. Again considering the use of borax and sodium bisulfite for the sake of a specific example, it is feasible to much increase the proportion of bisulfite, or, conversely, to much reduce the proportion of borax, without encountering serious difficulty due to instability of the mixed solution. For example, a solution obtained by the use of one part of borax to three parts of sodium bisulfite, using two ounces of borax and six ounces of bisulfite to each gallon of water, is substantially stable, develops hardly any odor of sulfurous acid even when the solution is heated to temperatures as high as 120° F., and can be used in the packing house without inconvenience to operatives. It is of course entirely feasible to use higher proportions of bisulfite but in such event it is advisable to provide proper ventilating apparatus to remove fumes of sulfurous acid gas which are given off to a greater or less extent from warm treating solutions of this character. Solutions containing four parts or more of bisulfite to one part of borax are typical of mixed solutions which have given good results in treating fresh fruit for control of blue mold and other rot reducing organisms. Such solutions are extremely efficient in their inhibiting action, and it is to be especially noted that the presence of even a relatively small proportion of borax or other alkaline reagent (e. g. ammonium, sodium or potassium hydroxid) serving to neutralize a part of the extra molecule of sulfurous acid in the bisulfite has a very pronounced stabilizing action in that it materially reduces the quantity of sulfurous acid fumes given off from a warm solution as compared to the quantity given off from a solution of sodium bisulfite alone. The amount of borax used in the solution may in some cases be as little as one tenth the amount of bisulfite.

While the proportions of borax and sodium bisulfite used in the treating solution may vary considerably, as hereinabove indicated, the amounts ordinarily found most useful in practicing the invention range in the case of each salt from 1 to 15 ounces per gallon of water.

The mixed solution described can be applied in various different ways in treating fresh fruit for prevention of blue mold or the like. According to one method, the fruit, if dirty, may first be thoroughly washed and cleansed with water in the customary manner and then subjected to the action of the mold-inhibiting solution. Owing to the remarkably effective mold-inhibiting action of said mixed solution and the ease with which it may be employed at relatively high concentrations, excellent results are obtainable with this procedure notwithstanding the tendency of the water taken up by the fruit rind tissues in the preliminary washing to dilute such of the mold-inhibiting solution as penetrates into said tissues and otherwise to interfere in some degree with the desired action of said solution on the fruit. This means that the mixed solution can be used very economically since it need not come into contact with dirty fruit and hence does not become foul and have to be thrown away. It is not to be inferred, however, that said mixed solution may not be used to wash the fruit in the first instance, although this is ordinarily not so economical as regards quantity of solution used and usually requires also a greater expenditure for apparatus and operation.

The mixed treating solution of the invention is especially well adapted for application to fruit with the aid of pressure. Such pressure may be applied in any suitable manner as, for example, by subjecting the solution with the fruit therein, while in a confined space, to positive mechanical pressure produced by a pump or plunger. Or, and usually more desirably, the fruit may be submerged in the treating solution to a depth sufficient to give hydrostatic pressure of the desired magnitude.

In any case, whether superatmospheric pressure be employed or not, the process of the invention is most effective when the treating solution is used warm but not hot enough to scald or have a cooking action on the fruit within the period of time that the fruit is maintained in contact therewith.

After treatment with the mold-inhibiting solution, the fruit may desirably receive a thin protective coating of waxy material to prevent shrinkage and withering and to maintain the fruit plump and firm. This further step is not an indispensable feature of the invention, however. Whether or not such waxy protective coating is applied to the fruit, it is advisable to remove from the surface of the fruit such excess of the mold-inhibiting salts as might render the appearance of the fruit objectionable in the trade; but this should be accomplished in such manner as to avoid destroying or materially weakening the resistance or immunity of the fruit to blue mold attack. Where this matter of appearance does not have to be considered, there is no need to remove the excess of mold-inhibiting salts.

In further explaining the principles of the invention, a practical embodiment thereof will be described for the sake of a concrete illustrative example which is to be understood as not restrictive. This description will refer to suitable apparatus that may be employed in practicing the invention in the form here chosen for purposes of explanation, said apparatus being illustrated more or less diagrammatically in the accompanying drawings, in which Figs. 1 and 1ª, placed end to end in registry on the line A—A, and considered together, constitute a view in side elevation, partly in section, of a typical apparatus system for applying the treating solution to fruit;

Fig. 2 is a fragmentary plan view showing certain constructional details of a part of the apparatus of Fig. 1; and Fig. 3 is a view in plan of further apparatus for handling the fruit after application of the treating solution.

Referring to the drawings, fresh fruit, such as oranges, is dumped as it comes from the grove upon an elevator 10, which discharges it over chute board 11 into soaking tank 12 of the usual or any suitable type. In this tank the fruit is soaked for two or three minutes in water as it advances toward elevator 13 by which it is removed from the tank and delivered over chute board 14 to a washer which may also be of any usual or suitable type. In the present instance this washer comprises one or more pairs of rotary brush rolls 15, mounted in parallel and cooperating to provide one or more runways between the members of each pair, the rolls sloping gently downward from the receiving end of the washer. The fruit indicated at F passes down the runway or runways, being subjected en route to the rubbing action of the brush rolls; and it is at the same time showered with clean water from spray nozzles 16 supplied from a header 17. A drip pan 18 is arranged below the brush rolls to catch the water falling therefrom which is allowed to waste through a suitable outlet 19.

The washed fruit is continuously discharged from the washer over chute board 20 and is then carried by elevator 21 and delivered over chute board 22 into treating tank 23 wherein the washed fruit is subjected to the action of a mold-inhibiting agent under pressure. In this instance the use of an aqueous solution of borax and sodium bisulfite, in the proportion of 2 ounces of borax and 6 ounces of bisulfite per gallon of water, may be assumed. Means are provided for advancing the fruit through the treating tank while it is maintained under pressure. One practical form of such means is here shown. Suitably supported by bearings in the sides or framework of the tank, are revoluble shafts 24, 25 and 26, upon which are mounted, respectively, drums 27, 28, and 29, each provided at its opposite ends with sprocket teeth 30. Instead of these drums, each shaft may carry a pair of sprockets. Around the drums are trained two endless sprocket chains 31 to which are fastened a plurality of blades or pushers 32; while to the edges of said pushers adjacent the chains is fastened an endless band 33 of canvas webbing or the like. The combination forms an endless conveyor driven by sprocket drum 29 to travel in the direction of the arrows, the arrangement being such that the blades or pushers 32 of the conveyor device will pass between the sides of the tank 23 with slight clearance between the ends of said blades and the sides of the tank. At 33ª is indicated means for supporting the upper course or run of the conveyor. Moreover, the conveyor device is so mounted that the lower course or run of the belt 33 travels horizontally a substantial distance below the liquid level 34 in said tank, a foot or more in a typical instance; while between the edges 35 of the blades or pushers and the bottom 36 of the tank there is a comfortable clearance, say six inches or so. The width of the blades 32, measured from the belt 33 to the edges 35, may be about a foot, for example. These dimensions are to be understood as merely illustrative of good practice where the degree of submergence is moderate and not as restrictive. By suitable modification of apparatus and procedure, the fruit may be submerged in the solution to a depth of ten to fifteen feet or more, with corresponding increase in the applied pressure.

Returning now to the fruit delivered to the treating tank over chute board 22, this fruit shortly after entering the tank is positively submerged by the action of the pushers 32 and belt 33 to a substantial depth below the level of the treating solution, and is thus subjected to a hydrostatic pressure corresponding to the depth of submergence; while at the same time the fruit is advanced slowly as a traveling stream through said solution. The minimum depth of submergence is a foot in the case here assumed; and as the fruit may be compelled to travel several layers deep through the solution, the average depth of submergence may be substantially greater. The rate at which the fruit is advanced in this manner toward the other end of the tank may be controlled by regulating the driving speed of the sprocket drum 29; but in any case the fruit should be subjected to the action of the treating solution for a sufficiently long time to ensure a sufficient mold-inhibiting action. The temperature of the treating solution should ordinarily be above 100° F., and for best results it should be kept at from 110° to 120° F., about 115° F. being good average practice. Under these conditions a stay of from 5 to 7 minutes in the treating tank gives good results. In general, the treating period should ordinarily not be less than 2 minutes, and it seldom need be longer than 10 minutes.

In order to maintain the solution at the proper temperature, a heater device 37, here indicated diagrammatically as a gas-fired tubular heater of known construction, is shown disposed in a well 38 located adjacent the receiving end of the tank, the heater being separated by heavy wire netting 39, or the like from the space through which the fruit travels, said netting constituting in effect a foraminous extension of the tank bottom 36. In order to effect further economy in the volume of treating solution required, displacement tanks 40 may be located within the treating tank just above the lower run of the belt 33, if desired.

The fruit as it is moved gradually through the treating tank by the pusher-conveyor mechanism, as described, finally reaches the elevator 41 at the opposite end of the tank. Ample clearance is provided between the lower edges of the pushers and the adjacent run of the elevator, as shown. The elevator removes the fruit from the tank, and, in the particular embodiment of the invention here being described, delivers it over chute board 42 to a conveyor belt 43. This belt carries the fruit under a rinsing device which sprinkles or showers plain water upon the fruit in carefully regulated quantity sufficient to remove superficial excess of the salts employed in the treating solution, but at the same time so limited as to avoid depriving the fruit of its resistance to blue mold and the like. In other words, only so much of the salts is removed by this rinsing as would result in unsightly whitish deposits on the surface of the fruit when allowed to dry. The degree to which the fruit can be rinsed with safety can be determined by tests made on the fruit preparatory to actual operation of the installation.

In the present instance, the rinsing device comprises a small tank 44 having a row of sprinkling apertures 45 in its bottom extending transversely across the conveyor belt 43. Plain cool water is supplied to the tank through pipe 46, and a constant water level is maintained in said tank by means of a float-controlled valve 47. The amount of water with which the fruit is rinsed as it passes under the rinser or sprinkler will depend upon the size of the sprinkler apertures, the head of water in the tank and the linear speed of the conveyor belt, any one or all of which factors can be adjusted to arrive at just the amount of rinsing required to accomplish the purposes in view. Where the conveyor belt speed is around 100 feet per minute, sprinkling apertures $\frac{3}{32}$ inch in diameter and spaced $\frac{3}{8}$ inch apart in the row, and a head of 4 to 6 inches of water in tank 44, will usually be found satisfactory. In general, it may be stated that fruit treated with a mold-inhibiting solution comprising both borax and sodium bisulfite seems able to withstand more rinsing without loss of resistance through blue mold and the like than fruit which has been treated under the same conditions with a solution containing only borax. This fact is of considerable practical importance because, since the surface of fruit treated in accordance with the new process can with safety be more thoroughly rinsed and cleansed of adherent mineral matter than was feasible under the prior practice, the fruit surface is in somewhat better condition after drying to receive a waxy protective coating. Where more or less mineral matter, such as borax and the like, is left on the surface of the fruit, even though it be scarcely noticeable upon careful inspection, the subsequent rubbing of waxy material on the fruit after its surface is dry is sometimes found to result in the appearance of grayish specks on the fruit, these specks being apparently due to a commixture of the surface excess of solid mold-inhibiting agent with the waxy material.

While application of a waxy protective coating to the fruit after treatment with the mold-inhibiting solution is advantageous, especially where the fruit is very ripe and soft as it is apt to be late in the season, such application is nevertheless not essential to a realization of great benefits from the mold-inhibiting treatment alone. Accordingly, the fruit after being rinsed and then transferred to the drier 48 for removal of sensible moisture from the surface thereof may, if desired, go directly to the grading belt, sizers, and bins (not shown), for packing into crates and shipment. On the other hand, where a waxy protective coating is to be applied to the fruit, it is carried by conveyor belt 49 to a rotary brush roll unit comprising parallel rotary brush rolls 50, and longitudinally moving brushing elements 50ª carried on an endless chain and cooperating with said brush rolls, both the rolls 50 and members 50ª having horsehair bristle surfaces, said parts cooperating in the manner shown to form a runway or runways through which the fruit passes. Adjacent the receiving end of the brush roll unit is mounted one or more devices 51, such as an air brush or atomizer, for spraying or atomizing fluid waxy material down upon the fruit as it enters the runway or runways. The amount of such material that is applied should be very small, and this amount is spread all over the fruit into a very thin film by the action of the horsehair brushes as the fruit advances along the runways. From the brush rolls 50, the fruit is received upon a belt conveyor 52 which may convey it directly without further treatment to the grading belt for the final packing operations above referred to. On the other hand, if the waxy material used be a composition comprising paraffin and a light solvent, it is sometimes advantageous to allow a substantial interval of time to elapse between the application of the paraffin composition and said final packing operations in order that the solvent mixed with the paraffin, if volatile, may have an opportunity to evaporate to at least some extent. To further this, the conveyor belt 52 may be arranged to advance the fruit circuitously rather than directly to the graders; and in some cases the fruit may be passed through another drier (not shown) similar to drier 48, before it reaches the graders.

Instead of removing the excess of salts from the fruit by rinsing, as described hereinabove, such excess may be removed otherwise. For instance, the fruit may go direct to the drier without rinsing, in which case it emerges from the drier with a more or less noticeable whitish powdery deposit thereon which can be removed by dry brushing the fruit on a rotary brush roll machine before sending it to the graders, or before applying a waxy coating, as the case may be. In this connection it may be noted that a dry deposit of mixed borax and sodium bisulfite is more easily dusted or brushed off, than is one of borax alone.

Fruit treated with the mold-inhibiting solution of the invention as hereinabove described, whether provided thereafter or not with a waxy protective coating, can be shipped to distant markets without refrigeration and with substantially no loss from blue mold decay either in transit or while it is being distributed through dealers to the ultimate consumers.

What is claimed is:

1. In the preparation of fresh fruit for market, the process of protecting such fruit against blue mold or other rot fungi which comprises subjecting the fruit to contact with an aqueous solution containing alkali metal salts of boric and sulfurous acids at a temperature insufficiently high to scald or cook the fruit.

2. In the preparation of fresh fruit for market, the process of protecting such fruit against blue mold or other rot fungi which comprises subjecting the friut to contact with an aqueous solution containing sodium salts of boric and sulfurous acids at a temperature insufficiently high to scald or cook the fruit.

3. In the preparation of fresh fruit for market, the process of protecting such fruit against blue mold or other rot fungi which comprises subjecting the fruit to contact with an aqueous solution of borax and sodium bisulfite at a temperature insufficiently high to scald or cook the fruit.

4. In the preparation of fresh fruit for market, the process of protecting such fruit against blue mold or other rot fungi which comprises subjecting the fruit to contact with an aqueous solution containing alkali metal salts of boric and sulfurous acids at a temperature insufficiently high to scald or cook the fruit, said solution being acid in reaction.

5. In the preparation of fresh fruit for market, the process of protecting such fruit against blue mold or other rot fungi which comprises subjecting the fruit to contact with an aqueous solution containing sodium salts of boric and sulfurous acids at a temperature insufficiently high to scald or cook the fruit, said solution being acid in reaction.

6. In the preparation of fresh fruit for market, the process of protecting such fruit against blue mold or other rot fungi which comprises subjecting the fruit to contact with an aqueous solution of borax and sodium bisulfite at a temperature insufficiently high to scald or cook the fruit, the proportion of borax being insufficient to neutralize the acidity of the bisulfite.

7. In the preparation of fresh fruit for market, the process of protecting such fruit against blue mold or other rot fungi which comprises subjecting the fruit to contact with an aqueous solution of borax and sodium bisulfite at a temperature insufficiently high to scald or cook the fruit, the amount of borax in said solution being at least one-tenth but somewhat less than three times the amount of sodium bisulfite, by weight.

8. In the preparation of fresh fruit for market, the process of protecting such fruit against blue mold or other rot fungi which comprises subjecting the fruit to contact with an aqueous solution of borax and sodium bisulfite at a temperature insufficiently high to scald or cook the fruit, each of said reagents being employed in amount ranging from 1 to 15 ounces per gallon of water.

9. In the preparation of fresh fruit for market, the process of protecting such fruit against blue mold or other rot fungi which comprises subjecting the fruit to contact with an aqueous solution of borax and sodium bisulfite in the approximate proportions of 4 ounces of borax to 2 ounces of bisulfite per gallon of water, said solution being employed at a temperature insufficiently high to scald or cook the fruit.

10. In the preparation of fresh fruit for market, the process of protecting such fruit against blue mold or other rot fungi which comprises subjecting the fruit to contact with an aqueous solution of borax and sodium bisulfite, the borax being present in the proportion of from 2 to 4 ounces, and disulfite in the proportion of 6 to 2 ounces, per gallon of water, and the solution being employed at a temperature insufficiently high to scald or cook the fruit.

11. In the preparation of fresh fruit for market the process which comprises advancing fresh fruit as a traveling stream through a body of an aqueous solution containing alkali metal salts of boric and sulfurous acids at a temperature insufficiently high to scald or cook the fruit.

12. In the preparation of fresh fruit for market, the process which comprises advancing fresh fruit as a traveling stream through a body of an aqueous solution containing alkali metal salts of boric and sulfurous acids at a temperature insufficiently high to scald or cook the fruit, said fruit being wet with said solution for a period of from 2 to 10 minutes.

13. In the preparation of fresh fruit for market, the process which comprises advancing fresh fruit as a traveling stream through a body of an aqueous solution containing alkali metal salts of boric and sulfurous acids at a temperature insufficiently high to scald or cook the fruit, said fruit being wet with said solution for a period of from 2 to 10 minutes, and rinsing the fruit to remove superficial excess of said salts while regulating the rinsing to avoid substantially lessening the resistance of the fruit to attack by rot organisms.

14. In the preparation of fresh fruit for market, the process which comprises subjecting fresh fruit to the decay-inhibiting action of an aqueous solution containing alkali metal salts of boric and sulfurous acids and applied with the aid of pressure, said solution being employed at a temperature insufficiently high to scald or cook the fruit.

15. In the preparation of fresh fruit for market, the process claimed in claim 14, further characterized by the fact that borax and sodium disulfite are used in said solution.

16. In the preparation of fresh fruit for market, the process claimed in claim 14, further characterized by the fact that sodium bisulfite and borax are used in said solution in the proportion of a least twice as much sodium bisulfite as borax, by weight.

17. In the preparation of fresh fruit for market, the process claimed in claim 14, further characterized by the fact that approximately 6 ounces of sodium bisulfite and 2 ounces of borax per gallon of water are employed in said solution.

18. In the preparation of fresh fruit for market, the process which comprises washing fresh fruit, and then subjecting it to the mold-inhibiting action of an aqueous solution containing alkali metal salts of boric and sulfurous acid, said solution being employed at a temperature insufficiently high to scald or cook the fruit.

19. In the preparation of fresh fruit for market, the process which comprises washing fresh fruit, and then subjecting it to the mold-inhibiting action, under pressure, of an aqueous solution containing alkali metal salts of boric and sulfurous acid, said solution being employed at a temperature insufficiently high to scald or cook the fruit.

20. In the preparation of fresh fruit for market, the process which comprises washing fresh fruit, and then subjecting it to the mold-inhibiting action, under pressure, of an aqueous solution of borax and sodium bisulfite, at least twice as much sodium bisulfite as borax, by weight, being used, said solution being employed at a temperature insufficiently high to scald or cook the fruit.

21. In the preparation of fresh fruit for market, the process of protecting fresh fruit against blue mold or other forms of decay which comprises subjecting the fruit to contact with an aqueous solution comprising an alkali metal bisulfite, partially but incompletely neutralized by addition thereto of an alkaline agent.

22. As a new composition of matter, a mold-inhibiting aqueous solution containing alkali metal salts of boric and sulfurous acids, said solution being acid in reaction.

23. As a new composition of matter, a mold-inhibiting aqueous solution containing borax and sodium bisulfite in proportions such that the solution is acid in reaction.

24. As a new composition of matter, a mold-inhibiting aqueous solution containing borax and sodium bisulfite in which the amount of borax is at least one-tenth but somewhat less than three times the amount of sodium bisulfite, by weight.

25. As a new composition of matter, a mold-inhibiting aqueous solution containing borax and sodium bisulfite in the approximate proportion of two parts of borax to one part of sodium bisulfite, by weight.

26. As a new composition of matter, a mold-inhibiting aqueous solution containing about 4 ounces of borax and 2 ounces of sodium bisulfite per gallon of water.

27. As a new composition of matter, a mold-inhibiting aqueous solution containing borax and sodium bisulfite in the approximate proportion of from one to two parts of borax to from one to three parts of sodium bisulfite, by weight.

28. As a new composition of matter, a mold-inhibiting aqueous solution containing about 2 to 4 ounces of borax and about 2 to 6 ounces of sodium bisulfite per gallon of water.

29. As a new composition of matter, a mold-inhibiting aqueous solution comprising alkali metal salts of boric and sulfurous acids, the proportions of the constituents being such that said solution is acid in reaction but is substantially stable at temperatures up to 120° F.

30. As a new composition of matter, a mold-inhibiting aqueous solution as set forth in claim 29, further characterized by the fact that borax and sodium bisulfite are used therein.

In testimony whereof we hereunto affix our signatures.

ERNEST M. BROGDEN.
MILES L. TROWBRIDGE.